May 26, 1959
W. O. ROSE
2,888,220
FISH ROD HOLDER
Filed Oct. 7, 1954
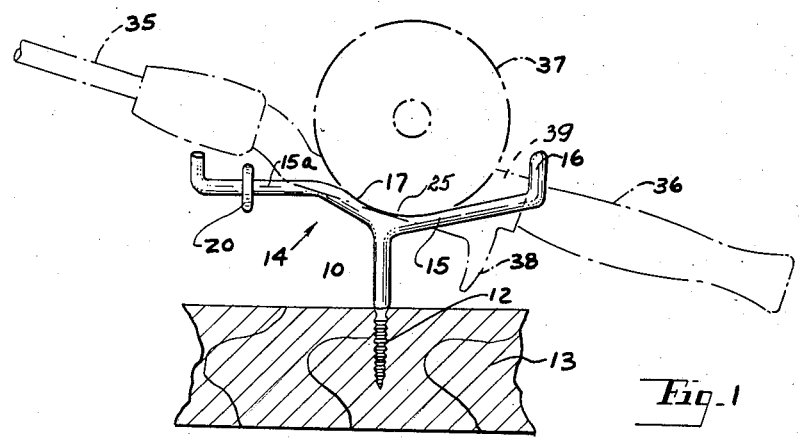
Fig. 1
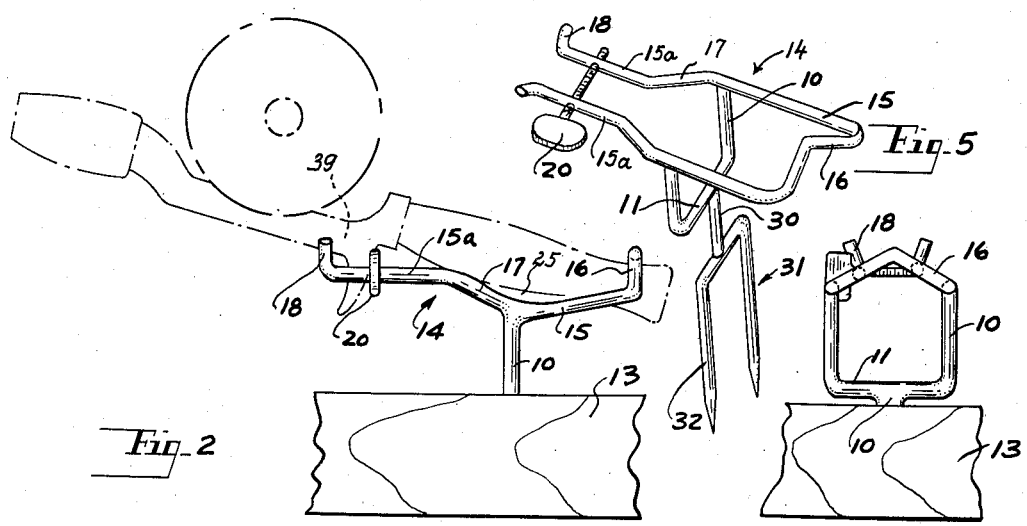
Fig. 2
Fig. 5
Fig. 3
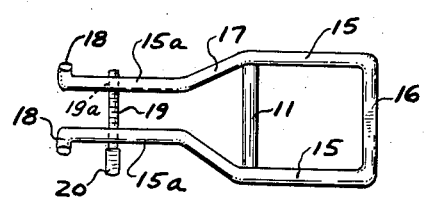
Fig. 4
INVENTOR.
William O. Rose
BY Louis Chayka
ATTORNEY.

United States Patent Office 2,888,220
Patented May 26, 1959

2,888,220

FISH ROD HOLDER

William O. Rose, Flat Rock, Mich.

Application October 7, 1954, Serial No. 460,820

2 Claims. (Cl. 248—42)

The improvement pertains to a holder which may be mounted either upon a suitable supporting member on a boat or dock, or which, in its modified species, may be thrust into the ground. The object of the invention is to provide a stand so constructed that the lower portion, that is, the handle portion of the rod with the reel secured thereto, may be quickly thrust into the stand for a holding engagement with elements thereof.

A more specific object of the invention is to provide a holder in which the handle portion of the rod, including the part which supports a reel, will be wedged against a twist about the axis of the rod, and which, in addition, will provide an arcuate support for the reel conforming to the shape thereof.

A further object of the improvement is to provide a holder in which the front portion, designed for the support of the reel mounting in said rod, may be adjusted to the width of said mounting in order to secure the rod against said twist.

Further advantages of the structure of the holder will become apparent from the following specification and the drawings in which:

Fig. 1 is a side elevational view of the holder, the view including the lower portion of a fish rod as held within the holder;

Fig. 2 is a side elevational view of the same holder, the view including the lower portion of the fish rod in a different position within said holder;

Fig. 3 is a rear elevational view of the holder;

Fig. 4 is a top elevational view of said holder;

Fig. 5 is a modified species of said holder.

Similar numerals refer to similar parts throughout the several views.

The holder is made of wire stock and includes a broad U-shaped bracket or stand in which two vertical legs 10 are joined by an integrally-formed cross-member 11. Extending downwardly from the cross-member, at a point midway its length, is a shank 12, its lower portion 12a forming a screw which may be threaded into a horizontally-disposed base 13. The shank is preferably welded to said cross-bar 11, even though some other manner of having the shank secured to said bar would serve as well.

Mounted upon the upper ends of legs 10 is a horizontally-disposed member generally identified by numeral 14. It, too, is made of a length of wire stock of the same diameter as the bracket, and includes, at one end, a rectangular frame or loop which is composed of two parallel side members 15 connected, at one end, by an integrally-formed bar 16. The end portions of the bar slant upwardly towards each other, so that said bar has the shape of a broad letter V in its inverted position and in a plane at right angle to the plane of the side members 15.

Beginning at approximately the points of juncture with the legs 10, the side members 15 converge towards each other and slant upwardly, as shown at 17. At the end of the upward incline, the side members, now identified by numeral 15a, run parallel to each other, each terminating at the end with an upwardly and outwardly-turned lug 18.

The lengths 15a of said side members 15 are held together by a screw 19 passing through apertures 19a in said side members, the screw being provided with a head 20 for manual operation thereof.

Thus, the member 14 mounted on the bracket defines a substantially-rectangular end portion, to be known as the rear portion, and a front portion composed of two parallel side members 15a in an adjustable spacing much closer than that of the side members 15 of the rear portion.

It will be noted that said last-discussed member 14 is provided with an arcuate dip 25 in the lengths of the side members 15, which said lengths are joined to the legs 10 of the U-shaped stand. The dip is shown in Figs. 1 and 2.

The species shown in Fig. 5 includes a shank 30 which terminates with a downwardly-extending fork 31 having tines 32 which may be thrust into the ground to support said member 14 in a substantially-horizontal position.

The fish rod 35, including a handle 36 and a fish reel 37 with its mounting 39, may be supported in the holder in two ways. One of said ways is illustrated in Fig. 1. As shown in said figure, the handle 36 fits into the rear portion of the holder, bearing from below into the apex of the V-shaped board 16. The reel 37 fits into the cradle-like dip 25 in said member 14.

The second way of supporting the fish rod in the holder is shown in Fig. 2. In this case only the outer end portion of the handle fits under the bar 16, while the rear portion of the mounting 39 will fit snugly between the two lugs 18, with the finger-piece 38 forming a part of the mounting projecting downwardly for easy handling of the rod at the time the rod is to be lifted off the holder.

It will be understood that some minor changes may be made in the structure of my holder without changing the basic form thereof.

What I wish to claim is as follows:

1. A fishing rod holder comprising a vertical, U-shaped stand including two vertically-extending legs and a cross-member, a vertical shank connected to said cross-member and extending downwardly therefrom, a horizontally-disposed wire frame mounted, midway its length, on the top of said legs, the frame including a rear portion defined by two parallel side arms and a cross-bar, and a front portion in which the arms are disposed parallel to each other in a reduced spacing each of the side arms in its mid-length being depressed to form an arcuate dip, and screw means joining said arms in said front portion for adjustable spacing therebetween.

2. A fishing rod holder comprising a vertical shank, a U-shaped member mounted upon the top of the shank in a vertical plane, the member including two vertical legs rising upwardly, a wire frame disposed horizontally and including a rear portion and a front portion, the rear portion being defined by two parallel arms and a transverse, integrally-formed rear end member bent into an upwardly-formed V formation, the front portion of the frame being defined by the same arms alone but disposed in a reduced spacing to each other, screw means to adjust the spacing between said arms at the front portion of the frame, each of the arms of the frame, intermediate its length, being depressed to form a dip and being connected at said dip to the respective leg of the vertical U-shaped member.

References Cited in the file of this patent

UNITED STATES PATENTS

| | | |
|---|---|---|
| 622,414 | Bradbury | Apr. 4, 1899 |
| 655,951 | Bates | Aug. 14, 1900 |
| 965,826 | Lynch | July 26, 1910 |
| 1,963,908 | Manasek | June 19, 1934 |
| 2,099,254 | Ballman | Nov. 16, 1937 |
| 2,293,305 | Oldham | Aug. 18, 1942 |
| 2,443,762 | Boal | June 22, 1948 |
| 2,458,881 | Steuer | Jan. 11, 1949 |

FOREIGN PATENTS

| | | |
|---|---|---|
| 77,472 | Norway | Oct. 2, 1950 |
| 106,092 | Australia | Dec. 7, 1938 |